United States Patent
Hosseini et al.

(10) Patent No.: US 7,420,877 B2
(45) Date of Patent: Sep. 2, 2008

(54) METHOD FOR PROCESSING AN ECHO PROFILE

(75) Inventors: Mazi Hosseini, Whitby (CA); Jean-René Larocque, Peterborough (CA); Adam Lomas, Havelock (CA)

(73) Assignee: Siemens Milltronics Process Instruments, Inc., Peterborough, Ontario (CA)

( * ) Notice: Subject to any disclaimer, the term of this patent is extended or adjusted under 35 U.S.C. 154(b) by 0 days.

(21) Appl. No.: 11/900,835

(22) Filed: Sep. 13, 2007

(65) Prior Publication Data

US 2008/0101158 A1    May 1, 2008

(30) Foreign Application Priority Data

Oct. 31, 2006    (EP) ................... 06022737

(51) Int. Cl.
*G01S 15/08* (2006.01)
*G01F 23/00* (2006.01)

(52) U.S. Cl. ................... 367/99; 367/908; 73/290 V
(58) Field of Classification Search ............ 367/99, 367/908; 73/290 V
See application file for complete search history.

(56) References Cited

U.S. PATENT DOCUMENTS

| | | | |
|---|---|---|---|
| 4,596,144 A | 6/1986 | Panton et al. | |
| 4,992,998 A | 2/1991 | Woodward | |
| 5,319,972 A | 6/1994 | Oblak et al. | |
| 6,169,706 B1 | 1/2001 | Woodward et al. | |
| 6,298,008 B1 * | 10/2001 | Lyon et al. | 367/99 |
| 6,816,436 B1 | 11/2004 | Bachert | |
| 6,935,177 B2 | 8/2005 | Wall | |
| 7,334,470 B1 * | 2/2008 | Bartoli et al. | 73/290 V |

FOREIGN PATENT DOCUMENTS

EP    0 262 990 A2    4/1988

* cited by examiner

*Primary Examiner*—Ian J Lobo

(57) ABSTRACT

In a method for processing an echo profile generated by a pulse-echo ranging system, the echo profile is compared with a time-varying threshold function to identify valid echoes in those portions of the echo profile which exceed the TVT function. Based on the amplitude and/or area above the TVT function, each echo is rated and attributed a level of confidence. The echo with the highest level of confidence is selected as the echo of interest, and the level of confidence is reported. To provide an improved echo processing with increased accuracy in determining the confidence level of the selected echo of interest, it is furthermore determined whether the portion of the threshold function which timely corresponds to the selected echo of interest is part of a hump-shaped section of the threshold function. If so, said section is reshaped to reduced hump amplitude, and the confidence level of the echo of interest is redetermined based on the amplitude and/or area above the reshaped TVT function.

17 Claims, 1 Drawing Sheet

METHOD FOR PROCESSING AN ECHO PROFILE

CROSS REFERENCE TO RELATED APPLICATIONS

This application claims priority of European application No. 06022737.8 EP filed Oct. 31, 2006, which is incorporated by reference herein in its entirety.

FIELD OF INVENTION

The present invention relates to a method for processing an echo profile generated by a pulse-echo ranging system comprising the steps of: providing a time-varying threshold function, comparing the echo profile with the threshold function, identifying valid echoes in those portions of the echo profile which exceed timely corresponding portions of the threshold function, determining confidence levels based on differences between the portions of the echo profile and the timely corresponding portions of the threshold function, assigning said confidence levels to the identified echoes and selecting the echo with the highest confidence level as the echo of interest.

BACKGROUND OF INVENTION

Such a method is known from U.S. Pat. No. 4,992,998 or U.S. Pat. No. 6,816,436.

Pulse-echo ranging systems, also known as time-of-flight ranging systems, are commonly used in level measurement applications for determining the distance to a target object (i.e. reflective surface) by measuring how long after transmission of a burst of energy pulses the echoes or reflected pulses are received. Such systems typically use ultrasonic pulses or pulsed radar or microwave signals.

Pulse-echo acoustic ranging systems generally include a transducer and a signal processor. The transducer serves the dual role of transmitting the energy pulses and receiving the reflected energy pulses or echoes. An echo profile is generated from the received energy pulses. Echo pulses are identified in the echo profile by the signal processor, and the distance or range of the target is calculated based on the transmit times of the transmitted energy pulses and the received echo pulses.

In a tank, for example, the most important target is the surface of the material contained in the tank. The measurement environment, however, is often cluttered with obstacles or it is noisy when the tank is filled. The obstacles may produce multiple echoes and the noise or the physical presence of tank walls may distort the echo from the material in the tank.

It is thus a challenge to identify the echo of interest that corresponds to the material. It is also important to assess a level of confidence that the echo selected is indeed the echo of interest.

The commonly used technique for finding valid echoes in an echo profile involves generating a time-varying threshold (TVT) function or curve. The TVT function provides a baseline on the echo profile indicating the level of noise and the presence of obstacles. Various algorithms and techniques are known in the art for determining the noise floor and generating the TVT function (e.g. U.S. Pat. No. 6,935,177). Valid echoes appear above the TVT function. Based on a variety of criteria (e.g. time of arrival, amplitude, amplitude and/or area above the TVT function), each echo is rated and attributed a level of confidence. The echo with the highest level of confidence is selected as the echo of interest, and the level of confidence is reported. If the confidence level falls below a certain level, the measurement is judged to be unreliable and the system reports a loss of echo (LOE).

In certain cases, the correct echo of interest is selected, but the confidence is underestimated. This can be caused by the presence of a secondary echo near by which causes the TVT function to rise, thus artificially decreasing the level of confidence of the selected echo.

SUMMARY OF INVENTION

It is therefore an object of the invention to provide an improved echo processing with increased accuracy in determining the confidence level of the selected echo of interest.

According to the invention this object is achieved by the method defined in claim 1 in that the initially mentioned method further comprises the steps of: determining whether the portion of the threshold function which timely corresponds to the selected echo of interest is part of a hump-shaped section of the threshold function, reshaping said section to a reduced hump amplitude and redetermining the confidence level of the echo of interest based on differences between the profile of the selected echo of interest and the timely corresponding portion of the reshaped threshold function exceeded by the selected echo of interest.

The thus redetermined confidence level is more representative of the selected echo and prevents the system from erroneously reporting losses of echo.

Preferred embodiments of the method according to the invention are specified in the remaining claims.

BRIEF DESCRIPTION OF THE DRAWINGS

The invention will be now described by way of a preferred example and with reference to the accompanying drawing, in which.

DETAILED DESCRIPTION OF INVENTION

Figure 1:
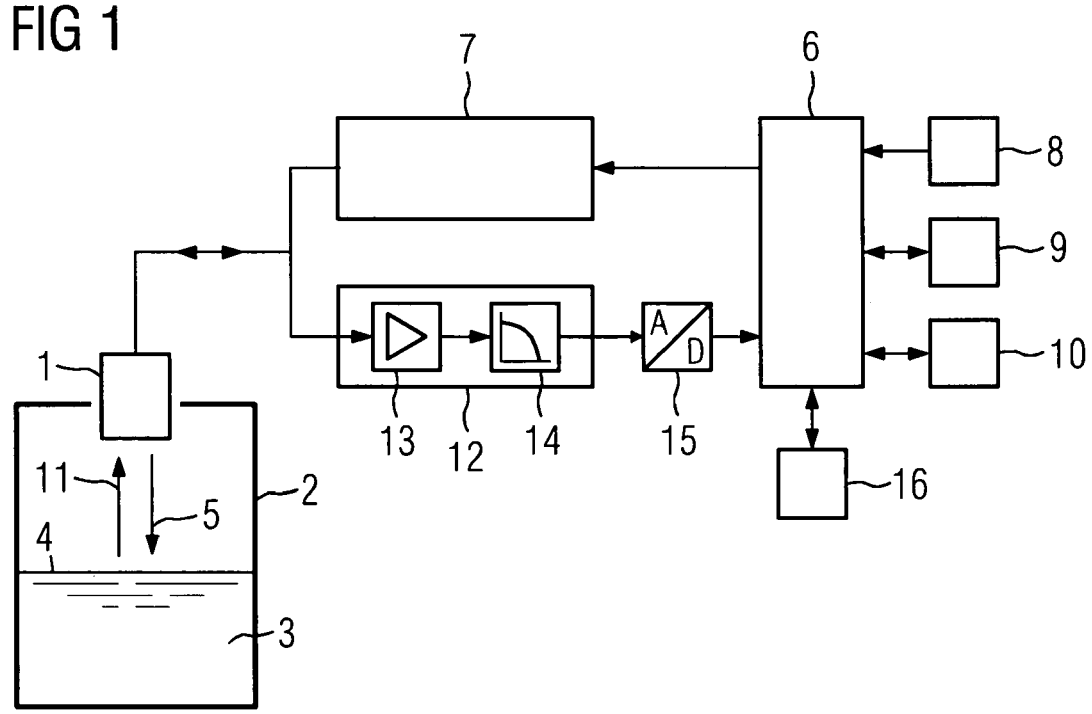
FIG. 1 shows a block diagram of a pulse-echo ranging system.

Reference is first made to FIG. 1 which shows a simplified schematic diagram of a pulse-echo ranging system. While the system and its operation are described in the context of an ultrasonic based pulse-echo acoustic ranging device, it should be understood that the system can also be radar based. The system comprises an ultrasonic transducer 1 which is installed in a tank 2 containing a liquid 3, or other type of material, with a level determined by the top surface 4 of the liquid 3. The top surface 4 of the liquid 3 provides a reflective surface which reflects the ultrasonic pulses 5 generated from the transducer 1. The transducer 1 is coupled to a microcontroller 6 through a transmitter 7. The microcontroller 6 operates under a control program stored in read-only memory (ROM) 8, utilizing parameters stored in non-volatile random access memory (NVRAM) 9, and provided with a working memory in the form of random access memory (RAM) 10. The microcontroller 6 controls the transmitter 7 to excite the transducer 1 to emit the ultrasonic pulses 5 at predetermined points in time and with a predetermined frequency and amplitude. The echoes or reflected pulses 11 from the surface 4 of the liquid 3, the wall of the tank 2 and obstacles in the measurement environment (not shown) are received by the transducer 1 and converted into an electrical signal which is then fed to a receiver 12. The transmitter 7 and the receiver 12 can be implemented individually or be combined to form a transceiver. The receiver 12 comprises an amplifier 13 and an envelope detector 14 for amplifying and thereafter shaping the electrical signal output from the transducer 1. The output from the envelope detector 14 is then sampled and digitized by an analog-to-digital converter 15, from where the digital echo profile is stored in the RAM 10 for further processing by the microcontroller 6. The microcontroller 6 executes an algorithm which identifies and verifies the true echo pulse 11 from the surface 4 of the liquid 3 and calculates the range of the reflective surface 4, i.e. the time it takes for the reflected ultrasonic pulse 11 to travel from the reflective surface 4 to the transducer 1. From this calculation, the distance to the surface 4 of the liquid 3 and thereby the level of the liquid 3 is determined. An interface 16, which is also controlled by the microcontroller 6, provides for the export of data from the pulse-echo ranging system, and the import of operating parameters. Data may be exported in the form of a display, telemetry (e.g. bus) signals and/or alarm signals.

Figure 2:
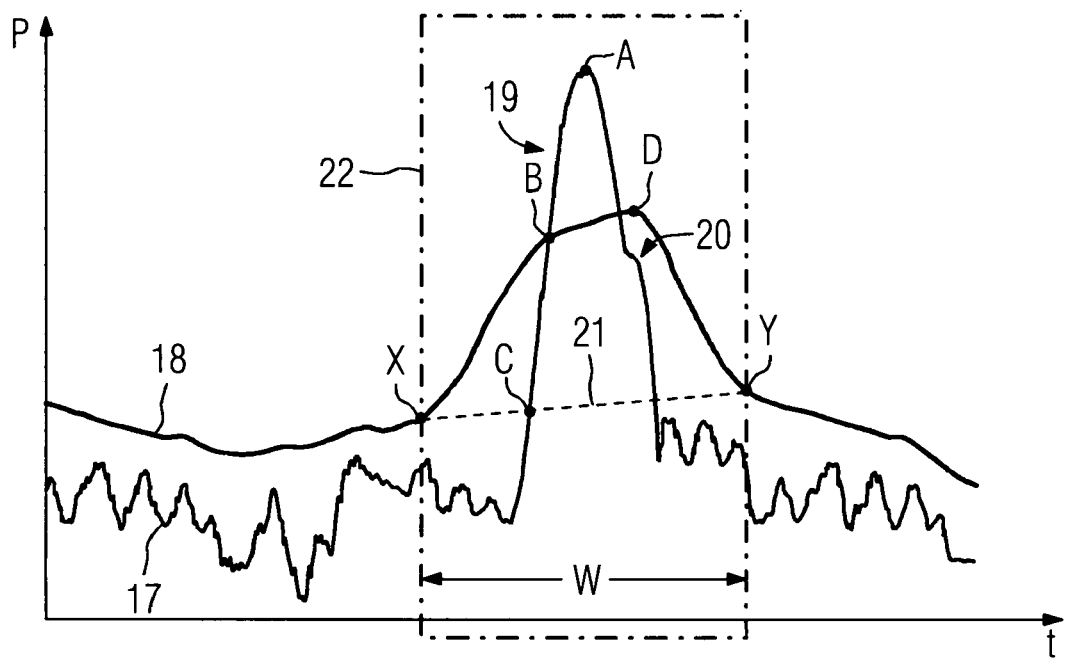
FIG. 2 shows an echo profile and a time-varying threshold function.

The diagram of FIG. 2 shows, by way of example, the intensities or amplitudes P of the echo profile 17 and a time-varying threshold (TVT) function 18 as a function of time t. The echo processing algorithm executed by the microcontroller 6 is designed as a two-pass algorithm. In the first pass, the echo of interest 19 is selected in known manner by comparing the echo profile 17 with the TVT function 18, identifying valid echoes in those portions of the echo profile 17 which exceed timely corresponding portions of the TVT function 18, determining confidence levels based on differences between the portions of the echo profile 17 and the timely corresponding portions of the TVT function 18, assigning said confidence levels to the identified echoes and selecting the echo with the highest confidence level as the echo of interest, here the echo 19. The confidence level is calculated by using the difference in intensity or amplitude P between the peak A of the selected echo 19 and the point B where the rising edge of the echo 19 intersects the TVT function 18. Alternatively, the area of the portion of the echo 19 above the TVT function 18 may be used to calculate the confidence level.

As can be seen from FIG. 2, the TVT function comprises a hump-shaped section in the region where the echo 19 of interest occurs. As can be further seen, the echo 19 is partially superimposed by a secondary echo 20 which additionally causes the TVT function 18 to rise, thus artificially decreasing the level of confidence of the selected echo 19. For this reason and as will be explained in more detail below, the TVT function 18 is analyzed and reshaped in a section 21 to remove the effect of the secondary echo 20. It can be clearly seen that the reshaped TVT function 21 is a better representation of the level of noise. In the second pass of the echo processing algorithm, the same echo 19 is selected again (since more of the echo 19 is now visible), and a new confidence level is determined, e.g. by using the difference in intensity or amplitude P between the peak A of the selected echo 19 and the point C where the rising edge of the echo 19 intersects the reshaped section 21 of the TVT function 18.

The following is an example of the echo processing algorithm:

BEGIN

1. Echo Processing has completed its 1$^{st}$ pass.
2. Define a window 22 of a predetermined time width W.
3. Find the first intersection point of the profile of the selected echo 19 and the TVT function 18. Let this intersection point be B.
4. If a manual mode is selected, go to MANUAL-MODE.

-continued

5. From the intersection point B, move right (time forwards) to the first local maximum of the TVT function 18. Let this maximum be D.
6. From the maximum D, move left (time backwards) until a significant change in slope in the TVT function 18 is encountered. Let this point be X.
7. From the maximum D, move right until a significant change in slope in the TVT function 18 is encountered. Let this point be Y.
8. If W = 0, go to END.
9. If W $\geq$ (Y – X), go to END.
10. Go to REDUCE-HUMP.

REDUCE-HUMP

11. If W/2 $\geq$ (B – X), move Y to the left until (Y – X) = W.
12. Go to END.
13. If W/2 $\geq$ (Y – B), move X to the right until (Y – X) = W.
14. Go to END.
15. Let X = B – W/2
16. Let Y = B + W/2
17. Go to END.

MANUAL-MODE

18. Let X = B – W/2
19. Let Y = B + W/2
20. Go to END

END

21. Reshape the TVT so that points X and Y are connected with a straight line 21.
22. Call the echo processing for the 2$^{nd}$ pass with the re-shaped TVT.
23. Continue with remaining echo processing.

In the foregoing, it should be noted that steps 9, 11, 13, 15, 16, 18 and 19 refer to positions or distances along the time axis and not to amplitudes or differences thereof. The algorithm only considers hump-shaped sections of the TVT function 18 which are equal to or wider than the predetermined width W of the window 22. Reshaping of the threshold function 18 is then limited to the width W of the window 22, wherein a weighted method is used to more or less center the window 22 about the first intersection point B of the profile of the selected echo 19 and the TVT function 18.

The invention claimed is:

1. A method for processing an echo profile, comprising:
providing a pulse-echo ranging system;
providing a time-varying threshold function;
comparing the echo profile with the threshold function;
identifying valid echoes in those portions of the echo profile which exceed timely corresponding portions of the threshold function;
determining confidence levels based on differences between the portions of the echo profile and the timely corresponding portions of the threshold function;
assigning the confidence levels to the identified echoes;
selecting the echo with the highest confidence level as the echo of interest;
determining whether the portion of the threshold function which timely corresponds to the selected echo of interest is part of a hump-shaped section of the threshold function;
reshaping the section to a reduced hump amplitude; and
redetermining the confidence level of the echo of interest based on differences between the profile of the selected echo of interest and the timely corresponding portion of the reshaped threshold function exceeded by the selected echo of interest.

2. The method as claimed in claim 1, wherein the reshaping comprises straightening the section of the threshold function.

3. The method as claimed in claim 1, wherein the hump-shaped section is defined as a monotonically increasing and then decreasing section.

4. The method as claimed in claim 2, wherein the hump-shaped section is defined as a monotonically increasing and then decreasing section.

5. The method as claimed in claim 1, wherein a window of a predetermined time width is applied to the threshold function for determining the hump-shaped section, and wherein the reshaping of the threshold function is only performed if the determined hump-shaped section is wider than the width of the window.

6. The method as claimed in claim 2, wherein a window of a predetermined time width is applied to the threshold function for determining the hump-shaped section, and wherein the reshaping of the threshold function is only performed if the determined hump-shaped section is wider than the width of the window.

7. The method as claimed in claim 3, wherein a window of a predetermined time width is applied to the threshold function for determining the hump-shaped section, and wherein the reshaping of the threshold function is only performed if the determined hump-shaped section is wider than the width of the window.

8. The method as claimed in claim 4, wherein a window of a predetermined time width is applied to the threshold function for determining the hump-shaped section, and wherein the reshaping of the threshold function is only performed if the determined hump-shaped section is wider than the width of the window.

9. The method according to claim 5, wherein the reshaping of the threshold function is limited to the width of the window.

10. The method as claimed in claim 1, wherein for determining of the hump-shaped section of the threshold function:
   an intersection point where the profile of the selected echo of interest first time exceeds the threshold function is identified,
   a first local maximum of the threshold function after the intersection point is identified,
   a first point of significant change in slope of the threshold function before said maximum is determined,
   a second point significant change in slope of the threshold function after said maximum is determined, and
   the first and second points of significant change in slope as the beginning and end, respectively, of the hump-shaped section of the threshold function are defined.

11. The method as claimed in claim 10, wherein the reshaping comprises resetting the threshold function to a straight line extending from the first point to the second point of significant change in slope.

12. The method as claimed in claim 10, wherein a window of a predetermined time width is applied to the threshold function for determining the hump-shaped section and wherein the reshaping of the threshold function is only performed if the determined hump-shaped section is wider than the width of the window.

13. The method as claimed in claim 11, wherein a window of a predetermined time width is applied to the threshold function for determining the hump-shaped section and wherein the reshaping of the threshold function is only performed if the determined hump-shaped section is wider than the width of the window.

14. The method as claimed in claim 12, wherein if the determined hump-shaped section is wider than the width of the window and if further the temporal distance between the first point of significant change in slope and the intersection point is equal to or less than the half of the width of the window, the second point of significant change in slope is shifted to a new distance from the first point of significant change in slope, said new distance being equal to the width of the window.

15. The method as claimed in claim 13, wherein if the determined hump-shaped section is wider than the width of the window and if further the distance between the second point of significant change in slope and the intersection point is equal to or less than the half of the width of the window, the first point of significant change in slope is shifted to a new distance from the second point of significant change in slope, said new distance being equal to the width of the window.

16. The method according to claim 12, wherein if the determined hump-shaped section is wider than the width of the window and if further the distances between each of the points of significant change in slope and the intersection point are greater than the half of the width of the window, the points of significant change in slope are shifted to a new distance from intersection point, said new distance being equal to the half of the width of the window.

17. The method according to claim 13, wherein if the determined hump-shaped section is wider than the width of the window and if further the distances between each of the points of significant change in slope and the intersection point are greater than the half of the width of the window, the points of significant change in slope are shifted to a new distance from intersection point, said new distance being equal to the half of the width of the window.

* * * * *